United States Patent
Kornilov et al.

Patent Number: 5,492,462
Date of Patent: Feb. 20, 1996

[54] METHOD FOR THE PRODUCTION OF LOW ENRICHED URANIUM HEXAFLUORIDE FROM HIGHLY-ENRICHED METALLIC URANIUM

[75] Inventors: Vitaly F. Kornilov; Anatoly P. Knutarev; Gennady S. Soloviev; Vadim V. Raev; Vyacheslav V. Klimovskikh; Sergei L. Tjutrjumov, all of Ekaterinburg, Russian Federation

[73] Assignee: Uralsky Elektromekhanichesky Kombinat, Ekaterinburg, Russian Federation

[21] Appl. No.: 263,469

[22] Filed: Jun. 22, 1994

[30] Foreign Application Priority Data

Aug. 23, 1993 [RU] Russian Federation ............. 93041459

[51] Int. Cl.⁶ .................................................. C01G 43/06
[52] U.S. Cl. ............................................................ 423/258
[58] Field of Search ..................................... 423/258, 253

[56] References Cited

U.S. PATENT DOCUMENTS 5,411,722  5/1995  McLean, II et al. ................ 423/253

OTHER PUBLICATIONS

1993 International Enrichment Conference, "Enrichment Blending: An Overview and Analysis", Jun. 13–15, 1993, Norman E. Brandon, Nuclear Fuel Services, Inc., pp. 1–12.

Primary Examiner—Ngoclan Mai
Attorney, Agent, or Firm—Ladas & Parry

[57] ABSTRACT

A method for the production of low enriched uranium hexafluoride from highly enriched metallic uranium consists of oxidizing metallic uranium highly enriched in uranium-235 at a temperature of 700°–1100° C. and fluorinating with elementary fluorine at temperature of 300°–1500° C. with a fluorine excess exceeding the stoichiometric value, then sublimating and mixing in a gas flow the resultant highly enriched uranium hexafluoride with uranium hexafluoride containing uranium-235 within a range from 0.2 to 4.9% by weight, in a ratio defined by the equation:

$$K = \frac{C^{HEU} - C^{LEU}}{C^{LEU} - C}$$

where
- $C^{HEU}$ is the content of uranium-235 in the highly enriched uranium,
- $C^{LEU}$ is the content of uranium-235 in the low enriched uranium,
- $C$ is the content of uranium-235 in uranium, the hexafluoride of which is used for mixing.

8 Claims, 3 Drawing Sheets

METHOD FOR THE PRODUCTION OF LOW ENRICHED URANIUM HEXAFLUORIDE FROM HIGHLY-ENRICHED METALLIC URANIUM

BACKGROUND OF THE INVENTION

1. Field of the Invention

The present invention relates to the field of producing materials for making fuel for nuclear power stations and particularly to a method for the production of low enriched uranium hexafluoride from uranium hexafluoride highly enriched in uranium-235.

The present invention can be utilized for producing low enriched uranium hexafluoride which serves as a starting material for making fuel for nuclear power stations.

2. Description of the Prior Art

In the disclosure of this invention, terminology accepted in world practice is used to describe various degrees of uranium enrichment, namely, highly enriched uranium is uranium enriched to 20% or more by weight in uranium-235; low enriched uranium is uranium enriched up to 5% by weight in uranium-235.

A method of producing low enriched uranium hexafluoride from highly enriched metallic uranium is known (see, for instance, Materials of International Enrichment Conference, June, 1993, Washington).

According to this method, metallic uranium is oxidized and dissolved in nitric acid to produce a liquid uranyl nitrate hexahydrate (UNH). The highly enriched UNH is mixed in a solution with natural or low enriched UNH to produce a homogeneous mixture of low enriched UNH. Impurities are removed using a standard solvent extraction process. The resulting purified low enriched uranium product can be shipped to reactor fuel fabricators in specially licensed containers.

This method does not make it possible to obtain final product which can be immediately utilized for fuel production. It is necessary to conduct one more reaction to convert UNH into uranium hexafluoride $UF_6$. It should be noted that metallic uranium is converted into a solution and the method is carried out in a liquid phase. From the point of view of nuclear safety, it is more dangerous to carry out the process in the liquid phase. Nitric acid is used, which has a negative effect on the environment, since nitric oxides are released in the process of dissolving the uranium oxides. The nitrates get into the air and soil.

Impurities are removed by the method of extraction, wherein inflammable extractants and solvents are used. The purification process substantially lengthens the technological process.

Furthermore, dosing errors inevitably appear during the dosing of liquid reaction components, which errors substantially exceed errors occurring during the dosing of gaseous components.

This method presupposes utilization of an aqueous technological process at all stages of processing highly enriched uranium, which is undesirable since liquid radioactive wastes are produced and a retardant of neutrons (hydrogen and carbon), is introduced, and also because of the probability of a spontaneous nuclear chain reaction.

The method most similar to the claimed method is the method for the production of low enriched uranium hexafluoride from a weapon grade highly enriched metallic uranium (see, for instance, Materials of the International Enrichment Conference, June, 1993, Washington), wherein a highly enriched metallic uranium is oxidized and the oxide of highly enriched uranium is mixed with a natural uranium oxide. After that, the resulting oxide mix is fluorinated and the enriched uranium hexafluoride is purified by means of dual stage distillation. Low enriched uranium hexafluoride is produced by mixing the purified uranium hexafluoride with natural uranium hexafluoride enriched 5% by weight. The low enriched uranium hexafluoride obtained is placed in the containers "30B".

When carrying out this method the danger exists that a nuclear chain reaction might occur. That is why this method includes multiple dilution of the starting material, increasing thereby many times the amount of oxides which need to be converted to uranium fluorides.

Preliminary mixing of highly enriched uranium oxides with natural uranium oxides is necessary because of nuclear safety requirements; highly enriched uranium must not be purified in a distillation apparatus since distillation apparatus designs do not possess nuclear safe configuration.

A large quantity of the product is fed for purification, and therefore, the energy consumption is large. The components are dosed in comparatively small volumes, the accuracy thereof being insufficient, and this affects the quality of the resultant product.

This process provides for distillation purification of the product. This is a complicated process carried out in a liquid phase at a pressure of 7 atm in an apparatus with a large working volume and high productivity. Whereupon the danger of an ecological catastrophe exists.

SUMMARY OF THE INVENTION

The object of the present invention is to provide a method for the production of low enriched uranium hexafluoride from highly enriched metallic uranium, wherein mixing highly enriched purified uranium hexafluoride with slightly enriched uranium hexafluoride in a precisely defined ratio in a gas flow makes it possible to obtain in a single mixing step a low enriched uranium hexafluoride, having a predetermined enrichment percentage of uranium-235, which serves as a base material for producing fuel for nuclear reactors.

A further object of the invention is to carry out the reaction of fluorinating highly enriched uranium oxides in apparatuses excluding the possibility of the occurrence of a nuclear chain reaction.

One more object of the invention is to conduct centrifugal separation of a gaseous mixture of highly enriched uranium hexafluoride and fluorides of its impurities with a cascade of centrifuges excluding the possibility of a nuclear chain reaction occurring.

The objects of the invention are attained by providing a method for the production of low enriched uranium hexafluoride, comprising oxidation of metallic uranium highly enriched in uranium-235, whereby a uranium oxide is formed, fluorination of the uranium oxide, purification and further desublimation of the resulting uranium hexafluoride, wherein according to the invention the following steps are provided:

oxidizing metallic uranium highly enriched in uranium-235 at a temperature of 700°–1100° C., whereby uranium oxide is formed;

fluorinating the resulting oxide with elementary fluorine at a temperature of 300°–1500° C. and with the amount of fluorine exceeding the stoichiometric value with subsequent desublimation of the resulting uranium hexafluoride, producing low enriched uranium hexafluoride by sublimating and mixing in a gas flow the formed highly enriched uranium hexafluoride with uranium hexafluoride supplied in a gas phase and containing uranium-235 in the range of from 0.2 to 4.9% by weight, the ratio of the highly enriched uranium hexafluoride to the uranium hexafluoride used for mixing with the highly enriched uranium hexafluoride being defined by the equation:

$$K = \frac{C^{HEU} - C^{LEU}}{C^{LEU} - C},$$

where $C^{HEU}$ is the content of uranium-235 in the highly enriched uranium, $C^{LEU}$ is the content of uranium-235 in the low enriched uranium, C is the content of uranium-235 in the uranium, the hexafluoride of which is used for mixing.

It is advisable that the obtained uranium oxides be comminuted to a powder state with particle size less that 100 microns.

In the case where transuranic impurities are present in the highly enriched metallic uranium, it is preferable that the transuranic impurities be removed by means extraction after the oxidation of the highly enriched metallic uranium.

It is also advisable in the case where impurities of stable elements are present in the highly enriched metallic uranium that after the fluorination and desublimation, sublimation be conducted and the impurities in the form of volatile fluorides of said stable elements be removed by means of centrifugal separation.

It is also advantageous to fluorinate the resultant oxides while continuously mixing at a temperature of 300°–400° C. and at a fluorine excess amount exceeding the stoichiometric value by 5–10%.

It is advantageous to fluorinate the resultant oxides at a temperature of 1400°–1500° C. and at a fluorine excess amount exceeding the stoichiometric value by 10–50%.

It is advisable to feed the resultant oxides to the fluorination zone by means of a gas-carrier.

It is advantageous to desublimate the resultant low enriched uranium hexafluoride into a technological reservoir at a temperature of –20° to –25° C. with subsequent melting, transfer to a container and holding in said container at a temperature of 90°–110° C. for homogenization.

BRIEF DESCRIPTION OF THE DRAWINGS

Hereinafter the invention will be described by particular examples of its practicing with references to the accompanying drawings, wherein.

DESCRIPTION OF PREFERRED EMBODIMENTS OF THE INVENTION

Figure 1:
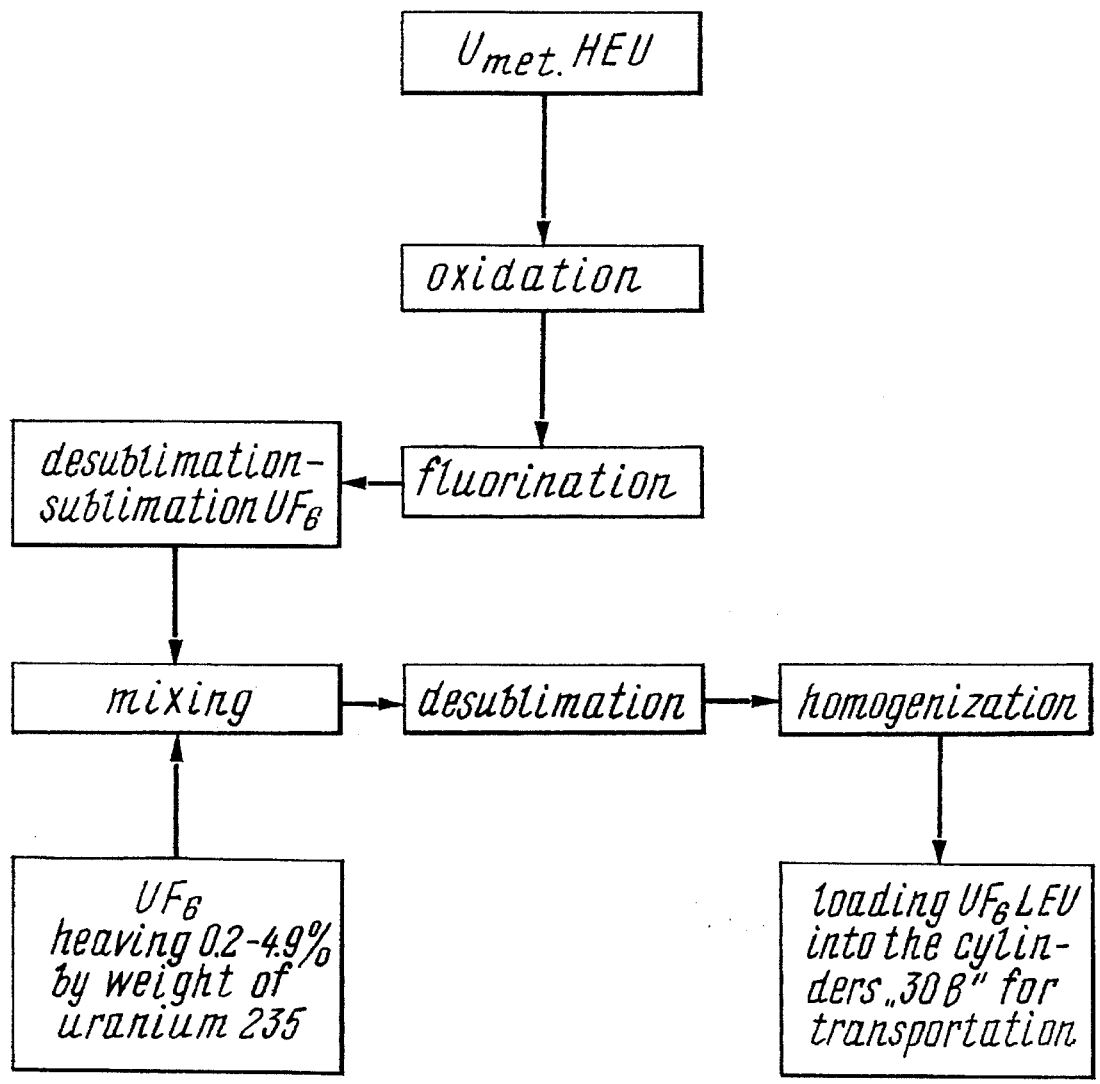
FIG. 1 is a schematic representation of the method for the production of low enriched uranium hexafluoride from highly enriched metallic uranium according to the present invention.
Figure 2:
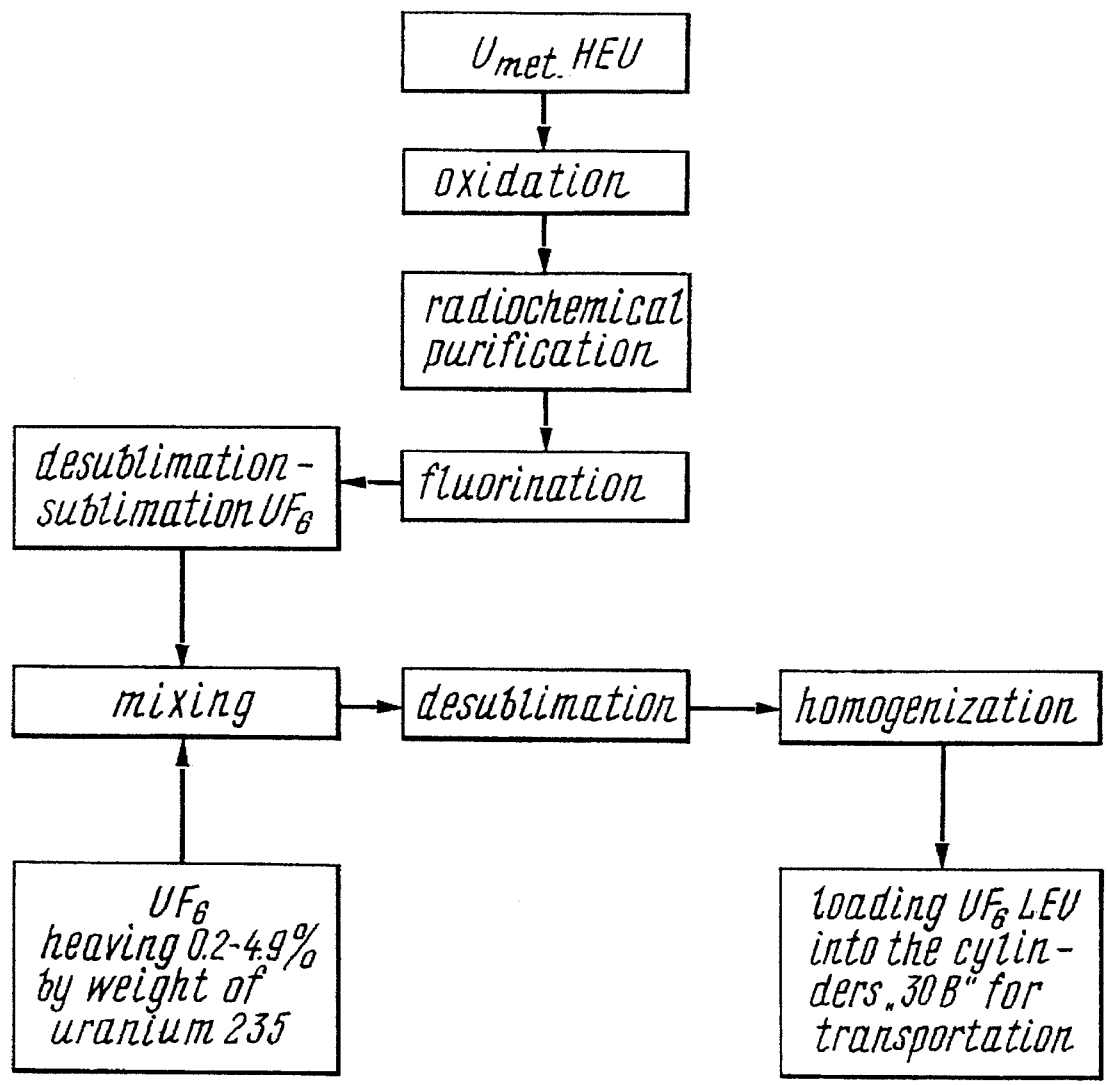
FIG. 2 is the same as FIG. 1 but including radiochemical purification from impurities of transuranic elements according to the present invention.
Figure 3:
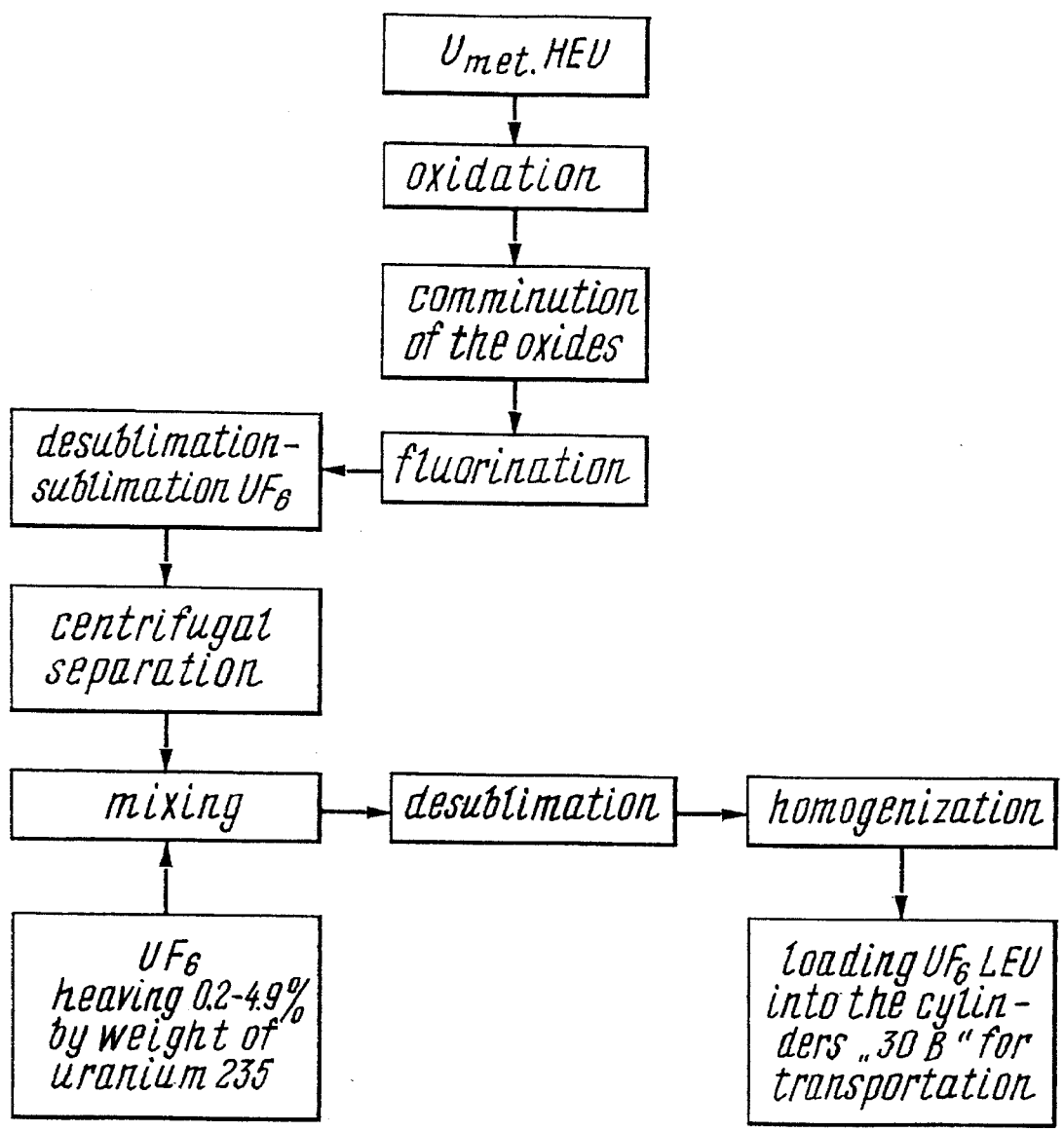
FIG. 3 is the same as FIG. 1, but including centrifugal separation for purification from impurities of stable elements according to the present invention.

The present method for the production of low enriched uranium hexafluoride from highly enriched metallic uranium is carried out in the following way.

All operations for converting weapon grade uranium into a hexafluoride are conducted by means of "dry methods", i.e. without application of liquid technologies, in nuclear safe apparatuses.

Metallic uranium is oxidized by means of cyclic heating and cooling at a temperature of 700°–1100° C. which ensures more rapid formation of uranium oxides and raises productivity. This is attained owing to self-purification of the uranium metal surface at the moment of beta-gamma phase transition and to a reduction of the metal volume at this moment by 0.7%, particles of the formed uranium oxides being separated from the total mass of metallic uranium. The phase transition temperature varies from 720° to 810° C. depending on the presence of impurities. When the oxidation is carried out at a temperature below 700° C., the process slows down and becomes inefficient since a dense oxide film appears at the metallic uranium surface and hinders the flow of air oxygen to the reaction surface. If the oxidizing temperature is raised from 700° to 1100° C., the rate of the oxidizing process increases monotonously.

Raising the process temperature above 1100° C. may lead to uncontrolled uranium conbustion due to the exothermic nature of the oxidizing process.

Not only pure oxygen, but also air, can be used to oxidize metallic uranium and its alloys, since raising the amount of oxygen above $45 \times 10^{-4}$ g/s cm$^3$ results in the same effects as raising the temperature above 1100° C.

After oxidation, the resulting uranium oxides are comminuted.

The comminuted uranium oxides are transferred to a fluorination stage, wherein the amount of fluorine used is reduced in the size of the oxide particles is less than 100 microns.

Selection of elementary fluorine as the fluorinating agent is due to the necessity to obtain uranium hexafluoride which cannot be obtained in reaction with other fluorinating agents, for instance, with hydrogene fluoride.

There are two possible fluorination modes.

The low-temperature fluorination mode is conducted at a temperature of 300°–400° C. and with fluorine in excess of the stoichiometric value by 5–10%.

The high-temperature fluorination mode is carried out at a temperature of 1400°–1500° C. and with fluorine in excess of the stoichiometric value by 5–50%. This embodiment ensures higher efficiency. In this case, the oxides are delivered to the fluorination stage by a gas-carrier, for example, by nitrogen.

When the highly enriched metallic uranium contains transuranic elements, after oxidation the uranium oxides are dissolved in an acid, for instance, in nitric acid, for purification.

The purification includes extraction of uranium by an extractant, for example, by a solution of tributyl phosphate in kerosene-synthine, subsequent reextraction of uranium, for instance, by a solution of ammonium carbonate, and calcination of the resulting compounds of ammonium uranyl tricarbonate until uranium oxide is obtained.

When the metallic uranium contains impurities of stable elements, such as molybdenum, tungsten, rhenium, producing highly volatile fluorides, the volatile fluorides are removed after the fluorination and desublimation stages.

Removal of the volatile fluoride impurities is conducted at a cascade of gas centrifuges. Uranium hexafluoride is purified from gaseous impurities having a molecular weight below the uranium hexafluoride molecular weight.

The design of the purification cascade is nuclear safe which ensures purification of uranium hexafluoride enriched to 97% by weight with uranium-235 and subsequent use of single stage mixing, without danger of a spontaneous nuclear chain reaction.

Uranium hexafluoride is purified of impurities down to their content of $10^{-4}$–$10^{-5}\%$ by weight.

Purification of impurities to the content of $10^{-4}$–$10^{-5}\%$ by weight makes it possible to use low enriched uranium with an increased content of impurities for mixing without impairment of the resultant fuel quality, which is more advantageous economically.

Then, the purified gaseous highly enriched uranium hexafluoride is delivered for mixing with uranium hexafluoride containing 0.2–4.9% uranium-235 by weight.

The ratio of highly enriched uranium hexafluoride to the uranium hexafluoride used for mixing therewith, is defined by the equation:

$$K = \frac{C^{HEU} - C^{LEU}}{C^{LEU} - C}$$

where $C^{HEU}$ is the content of uranium-235 in the highly enriched uranium, $C^{LEU}$ is the content of uranium-235 in the low enriched uranium, C is the content of uranium-235 in the uranium, the hexafluoride of which is used for mixing.

Selection of a particular hexafluoride composition for mixing with highly enriched uranium hexafluoride is determined by their uranium-235 content and by the composition and amount of the resulting fuel.

When mixing enriched uranium hexafluoride to 97% by weight with uranium-235 to produce final fuel containing 80% of uranium-235 by weight, one can take uranium hexafluoride containing from approximately 79% to zero per cent of uranium-235 by weight for mixing. In this case, the determining factor is the required quantity of the finished fuel, i.e. the larger the amount of the required finished fuel, the higher the enrichment of the second flow.

Flow rate controlling units are arranged, in pipelines to provide highly precise control of the final product composition.

The resultant uranium hexafluoride mix is desublimated at a temperature of $-20°$ to $-25°$ C. into technological containers, heated up to $90°$–$110°$ C. for homogenization and transferred to the cylinders "30B" where it is maintained for 3–6 hours.

To better understand the present invention, specific examples of its implementation are hereinafter presented.

EXAMPLE 1

A part of an article made of a weapon grade highly enriched metallic uranium not exceeding 6000 g in weight was loaded in to an oxidation apparatus. It was heated to $900°$ C. in an air flow and maintained thus to full oxidation.

The obtained uranium oxides were comminuted and delivered to a horizontal reactor for low temperature fluorination with periodical mixing.

During heating up to temperature $300°$ C. and with fluorine consumption exceeding the stoichiometric value by 5–10%, uranium oxyfluorides were produced which converted to uranium hexafluoride when the temperature was raised to $400°$ C. Uranium yield to hexafluoride reached 97.7%. Fluorine usage factor was 85–90%.

The resultant uranium hexafluoride was desublimated, then sublimated and delivered to a centrifugal separation stage at a cascade of gas centrifuges for purifying of fluorides of elements having a molecular weight below the molecular weight of uranium hexafluoride.

Uranium hexafluoride, purified of impurities to $10^{-4}$–$10^{-5}\%$ by weight, was delivered to a desublimation stage. Enriched uranium hexafluoride with a degree of enrichment 90% by uranium-235 was delivered from the desublimation apparatus in gaseous phase through a discharge unit to a mixing collector. Uranium hexafluoride with a degree of enrichment 1.5% by uranium-235 was fed to the same place through a discharge unit.

The ratio of the uranium hexafluoride flows is determined by the equation:

$$K = \frac{C^{HEU} - C^{LEU}}{C^{LEU} - C} = \frac{90 - 4.4}{4.4 - 1.5} = \frac{85.6}{2.9} = 29.5$$

Therefore, if 1 g of highly enriched uranium hexafluoride is fed per second, it is necessary to deliver 29.5 g of uranium hexafluoride containing 1.5% by weight of uranium-235 per second, to obtain uranium hexafluoride having 4.4% by weight of uranium-235.

The resultant uranium hexafluoride mix is desublimated at a temperature of $-20°$ to $-25°$ C. in to technological containers, heated up to $90°$–$110°$ C. for homogenization and transferred to the cylinders "30B" where it is maintained for 3–6 hours.

EXAMPLE 2

A part of an article made of a weapon grade highly enriched uranium, not exceeding 6000 g in weight, was loaded into an oxidation apparatus, the apparatus was sealed, air being introduced into it, and heated up to $700°$ C. During the heating and air introduction, owing to the exothermic nature of the oxidation process uranium was heated to the temperature point of beta-uranium phase transition in the gamma modification ($772°$ C.).

Wherein the volume of metal was reduced and uranium oxide particles were self-separated from the metal surface. The heating was turned off when the temperature reached $800°$ C. Five hours were required to oxidize the 6000 g of metallic uranium. The highly enriched uranium oxide removed from the oxidation apparatus was comminutes in a mill and delivered to a feeder-dispenser for aeration with subsequent continuous transport of the aero-mixture by a nitrogen gas-carrier to the reaction zone of a reactor for high temperature fluorination. When elementary fluorine in an amount exceeding by 30% the amount required by stoichiometry was fed into the reaction zone, the flame was ignited and a temperature of $1400°$–$1500°$ C. established. The fluorination rate was 5 kg oxide per hour. Yield of uranium to hexafluoride reached 99.9% for one cycle.

The subsequent processing of the obtained hexafluoride was conducted as in Example 1.

The present invention can be utilized for producing uranium hexafluorides having various degrees of uranium-235 enrichment. Nuclear safe apparatuses were used for practicing the method. The mixing process was conducted in a gas phase in one stage whereby the possibility of nuclear chain reaction was entirely excluded.

We claim:

1. A method for the production of low enriched uranium hexafluoride from highly enriched metallic uranium, which comprises:

oxidizing highly enriched in uranium-235 metallic uranium at a temperature of 700°–1100° C. whereby uranium oxide is produced, fluorinating the resultant oxide with elementary fluorine at a temperature of 300°–1500° C. and a fluorine excess exceeding the stoichiometric value and subsequently desublimating the resultant uranium hexafluoride, and producing low enriched uranium hexafluoride by means of sublimating and mixing in a gas flow the resultant highly enriched uranium hexafluoride with uranium hexafluoride, introduced in a gas phase and containing uranium-235 within a range of 0.2–4.9% by weight, the ratio of the highly enriched uranium hexafluoride to the uranium hexafluoride, used for mixing with the highly enriched uranium hexafluoride, being defined by the equation:

$$K = \frac{C^{HEU} - C^{LEU}}{C^{LEU} - C},$$

where $C^{HEU}$ is the content of uranium-235 in the highly enriched uranium, $C^{LEU}$ is the content of uranium-235 in the low enriched uranium, C is the content of uranium-235 in uranium the hexafluoride of which is used for mixing.

2. The method as set forth in claim 1, wherein the resultant uranium oxides are comminuted to a powder state with a particle size less than 100 microns.

3. The methods as set forth in claim 1, wherein in the case where impurities of transuranic elements are present in the highly enriched metallic uranium, the impurities of transuranic elements are removed by means of extraction after oxidation of the highly enriched metallic uranium.

4. The method as set forth in claim 1, wherein in the case where impurities of stable elements are present in the highly enriched metallic uranium after the fluorination and desublimation the impurities are sublimated and removed as volatile fluorides of said stable elements by means of centrifugal separation.

5. The method as set forth in claim 1, wherein the fluorination of the resultant oxides is conducted with continuous mixing at a temperature of 300°–400° C. and with a fluorine excess exceeding the stoichiometric value by 5–10%.

6. The method as set forth in claim 4, wherein the fluorination of the resultant oxides is conducted at a temperature of 1400°–1500° C. and with a fluorine excess exceeding the stoichiometric value by 10–50%.

7. The method as set forth in claim 6, wherein the resultant oxides are fed to the fluorination zone by a gas-carrier.

8. The method as set forth in claim 1, wherein the resultant low enriched uranium hexafluoride is desublimated into a technological container at a temperature of −20° to −25° C. with subsequent melting, transfer to a container and maintenance in said container at a temperature of 90°–110° C. for homogenization.

* * * * *

UNITED STATES PATENT AND TRADEMARK OFFICE
CERTIFICATE OF CORRECTION

PATENT NO. : 5,492,462
DATED : February 20, 1996
INVENTOR(S) : Vitaly F. KORNILOV, et al.

It is certified that error appears in the above-indentified patent and that said Letters Patent is hereby corrected as shown below:

Title Page, Item [73] "Uralsky Elektromekhanichesky Kombinat" should be -- Uralsky Elektrokhimichesky Kombinat --.

Signed and Sealed this

Thirteenth Day of August, 1996

*Attest:*

BRUCE LEHMAN

*Attesting Officer*     *Commissioner of Patents and Trademarks*